(12) United States Patent
Cai

(10) Patent No.: US 9,384,085 B2
(45) Date of Patent: Jul. 5, 2016

(54) METHOD, DEVICE, AND SYSTEM FOR MONITORING QUICKPATH INTERCONNECT LINK

(71) Applicant: Huawei Technologies Co., Ltd., Shenzhen (CN)

(72) Inventor: Youming Cai, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 296 days.

(21) Appl. No.: 14/145,280

(22) Filed: Dec. 31, 2013

(65) Prior Publication Data

US 2014/0115421 A1  Apr. 24, 2014

Related U.S. Application Data

(63) Continuation of application No. PCT/CN2011/079326, filed on Sep. 5, 2011.

(51) Int. Cl.
*H03M 13/00* (2006.01)
*G06F 11/10* (2006.01)
(Continued)

(52) U.S. Cl.
CPC ........ *G06F 11/1004* (2013.01); *G06F 11/0706* (2013.01); *G06F 11/0754* (2013.01); *H04L 43/0823* (2013.01); *H04L 43/16* (2013.01)

(58) Field of Classification Search
CPC .. H03M 13/09; H03M 13/091; H04L 1/0061; H04L 1/0057; H04L 1/0045
USPC .......................................................... 714/758
See application file for complete search history.

(56) References Cited

U.S. PATENT DOCUMENTS

| 2005/0071482 A1 | 3/2005 | Gopisetty et al. |
| 2005/0240797 A1 | 10/2005 | Orava et al. |
| 2009/0074046 A1 | 3/2009 | Huang et al. |

(Continued)

FOREIGN PATENT DOCUMENTS

| CN | 1860731 A | 11/2006 |
| CN | 1934561 A | 3/2007 |

(Continued)

OTHER PUBLICATIONS

Foreign Communication From A Counterpart Application, PCT Application No. PCT/CN2011/079326, English Translation of International Search Report dated May 24, 2012, 3 pages.

(Continued)

*Primary Examiner* — Albert Decady
*Assistant Examiner* — Enam Ahmed
(74) *Attorney, Agent, or Firm* — Conley Rose, P.C.; Grant Rodolph

(57) ABSTRACT

A method, device, and system for monitoring a quickpath interconnect link. The method includes: acquiring, by a quickpath interconnect link monitoring device, a number of code errors of a cyclic redundancy code check on the quickpath interconnect link and a routing table information for the nodes; comparing the number of the code errors of the cyclic redundancy code check and a preset code error threshold of the cyclic redundancy code check; obtaining a result from the comparison; and mapping the result and the routing table information into a first graphical interface, wherein the first graphical interface is used to indicate the connection state of the quickpath interconnect link according to the result and the routing table information.

8 Claims, 5 Drawing Sheets

(51) Int. Cl.
*G06F 11/07* (2006.01)
*H04L 12/26* (2006.01)

(56) References Cited

U.S. PATENT DOCUMENTS

| | | | |
|---|---|---|---|
| 2009/0198957 A1 | 8/2009 | Arimilli et al. | |
| 2010/0066562 A1* | 3/2010 | Stahlin | G08G 1/162 340/902 |
| 2011/0138261 A1 | 6/2011 | Bains et al. | |
| 2011/0231697 A1* | 9/2011 | Berke | G06F 11/004 714/3 |
| 2012/0005556 A1* | 1/2012 | Chang | G06F 12/1009 714/758 |

FOREIGN PATENT DOCUMENTS

| | | |
|---|---|---|
| CN | 1968064 A | 5/2007 |
| CN | 101247278 A | 8/2008 |
| CN | 101615155 A | 12/2009 |
| CN | 101872213 A | 10/2010 |
| WO | 2007009043 A1 | 1/2007 |
| WO | 2010047950 A2 | 4/2010 |
| WO | 2010071628 A1 | 6/2010 |

OTHER PUBLICATIONS

Foreign Communication From A Counterpart Application, PCT Application No. PCT/CN2011/079326, English Translation of Written Opinion dated May 24, 2012, 8 pages.

"Advanced Platform and System Management," IBM, ATS, 2010, 39 pages.

Foreign Communication From A Counterpart Application, European Application No. 11864819.5, Extended European Search Report dated Jul. 16, 2014, 6 pages.

* cited by examiner

METHOD, DEVICE, AND SYSTEM FOR MONITORING QUICKPATH INTERCONNECT LINK

CROSS-REFERENCE TO RELATED APPLICATIONS

This application is a continuation of International Application No. PCT/CN2011/079326, filed on Sep. 5, 2011, which is hereby incorporated by reference in its entirety.

TECHNICAL FIELD

The present disclosure relates to the field of computer technologies, and in particular to a method, device, and system for monitoring a quickpath interconnect link.

BACKGROUND

In a midrange computer program of a fault-tolerant computer, a core technology of a midrange computer is interconnection architecture between central processing units (CPUs), and stability of the interconnection architecture depends on integrality of a quickpath interconnect (QPI) signal.

For the purpose of testing the integrality of the QPI signal, a quantitative test for the QPI signal integrity (SI) is used in the prior art, where an INTEL QPI load board (QLB) working with an oscilloscope and software such as an INTEL quickpath tool kit (QTK) and SIGTEST is used to test signal integrality of the QPI signal. Firstly, the QLB detects the QPI signal and transmits the QPI signal to the oscilloscope; then, the oscilloscope outputs a waveform file to the SIGTEST software running in a computer; and finally, the SIGTEST software outputs a test result.

However, in an existing test solution, an independent test device (such as a load board and an oscilloscope) and independent test software (such as QTK and SIGTEST) are required for testing. The required test cost is relatively high and operations are relatively complex.

SUMMARY

Embodiments of the present disclosure provide a method, device, and system for monitoring a quickpath interconnect link, which can implement monitoring on a QPI link with simple operations at a relatively low cost.

A method for monitoring a quickpath interconnect link provided in an embodiment of the present disclosure includes: acquiring, by a device for monitoring a quickpath interconnect link, code error information of a cyclic redundancy code check of a system under test (SUT) and routing table information of the system under test SUT, where the code error information of the cyclic redundancy code check includes the number of code errors of the cyclic redundancy code check and the number of retransmissions on a quickpath interconnect link; determining, by the device for monitoring a quickpath interconnect link, whether the number of the code errors of the cyclic redundancy code check exceeds a preset code error threshold of the cyclic redundancy code check, and obtaining a first determination result; if the first determination result is that the number of the code errors of the cyclic redundancy code check exceeds the preset code error threshold of the cyclic redundancy code check, mapping, by the device for monitoring a quickpath interconnect link, the first determination result and the routing table information into a first graphical interface, where the first graphical interface is used to display a quickpath interconnect link connection state between nodes in the system under test according to the first determination result and the routing table information; if the first determination result is that the number of the code errors of the cyclic redundancy code check does not exceed the preset code error threshold of the cyclic redundancy code check, determining, by the device for monitoring a quickpath interconnect link, whether the number of the retransmissions on the quickpath interconnect link exceeds a preset retransmission threshold of the quickpath interconnect link, and obtaining a second determination result; and mapping, by the device for monitoring a quickpath interconnect link, the second determination result and the routing table information into a second graphical interface, where the second graphical interface is used to display the quickpath interconnect link connection state between the nodes in the system under test according to the second determination result and the routing table information.

A device for monitoring a quickpath interconnect link provided in an embodiment of the present disclosure includes: an acquiring unit, configured to acquire code error information of a cyclic redundancy code check of a system under test SUT and routing table information of the system under test SUT, where the code error information of the cyclic redundancy code check includes the number of code errors of the cyclic redundancy code check and the number of retransmissions on a quickpath interconnect link; a first determining unit, configured to determine whether the number of the code errors of the cyclic redundancy code check exceeds a preset code error threshold of the cyclic redundancy code check, and obtain a first determination result; a first mapping unit, configured to, when the first determination result is that the number of the code errors of the cyclic redundancy code check exceeds the preset code error threshold of the cyclic redundancy code check, map the first determination result and the routing table information into a first graphical interface, where the first graphical interface is used to display a quickpath interconnect link connection state between nodes in the system under test according to the first determination result and the routing table information; a second determining unit, configured to, when the first determination result is that the number of the code errors of the cyclic redundancy code check does not exceed the preset code error threshold of the cyclic redundancy code check, determine whether the number of the retransmissions on the quickpath interconnect link exceeds a preset retransmission threshold of the quickpath interconnect link, and obtain a second determination result; and a second mapping unit, configured to map the second determination result and the routing table information into a second graphical interface, where the second graphical interface is used to display the quickpath interconnect link connection state between the nodes in the system under test according to the second determination result and the routing table information.

A system for monitoring a quickpath interconnect link provided in an embodiment of the present disclosure includes: a system under test SUT and a device for monitoring a quickpath interconnect link that is capable of displaying a quickpath interconnect link connection state between nodes in the system under test, where: the device for monitoring a quickpath interconnect link is configured to acquire code error information of a cyclic redundancy code check of the system under test and routing table information of the system under test, where the code error information of the cyclic redundancy code check includes the number of code errors of the cyclic redundancy code check and the number of retransmissions on a quickpath interconnect link; determine whether the number of the code errors of the cyclic redundancy code check exceeds a preset code error threshold of the cyclic redundancy code check, and obtain a first determination result; if the first determination result is that the number of the code errors of the cyclic redundancy code check exceeds the preset code error threshold of the cyclic redundancy code check, map the first determination result and the routing table information into a first graphical interface, where the first graphical interface is used to display the quickpath interconnect link connection state between the nodes in the system under test according to the first determination result and the routing table information; if the first determination result is that the number of the code errors of the cyclic redundancy code check does not exceed the preset code error threshold of the cyclic redundancy code check, determine whether the number of the retransmissions on the quickpath interconnect link exceeds a preset retransmission threshold of the quickpath interconnect link, and obtain a second determination result; and map the second determination result and the routing table into a second graphical interface, where the second graphical interface is used to display the quickpath interconnect link connection state between the nodes in the system under test according to the second determination result and the routing table.

It can be seen from the above technical solution that embodiments of the present disclosure have the following advantages:

In the embodiments of the present disclosure, after a device for monitoring a quickpath interconnect link acquires code error information of a cyclic redundancy code check of a system under test and routing table information of the system under test, the device for monitoring a quickpath interconnect link maps a first determination result and the routing table information into a first graphical interface in a case that the number of code errors of the cyclic redundancy code check exceeds a preset code error threshold of the cyclic redundancy code check; and in a case that the number of code errors of the cyclic redundancy code check does not exceed the preset code error threshold of the cyclic redundancy code check, obtains a second determination result by determining whether the number of the retransmissions on a quickpath interconnect link exceeds a preset retransmission threshold of the quickpath interconnect link, and maps the second determination result and the routing table information into a second graphical interface. By using the first graphical interface or the second graphical interface, a user can intuitively view a QPI link connection state of the entire system under test. In the embodiment of the present disclosure, the code error information of the cyclic redundancy code check of the system under test and the routing table information of the system under test may be acquired by a software apparatus (that is the device for monitoring a quickpath interconnect link in the embodiment of the present disclosure), and no independent test device needs to be added (for example, no load board needs to be added) for implementation. In addition, the device for monitoring a quickpath interconnect link is capable of obtaining a graphical interface by mapping the first determination result or the second determination result and the routing table information, and no independent test device is further required (that is no oscilloscope needs to be added) for transforming a QPI signal to a waveform file and outputting the waveform file to test software SIGTEST. In the embodiment of the present disclosure, a QPI link connection state can be displayed in real time by using a graphical interface, thereby reducing a test cost, and implementing an operation process easily and simply.

DESCRIPTION OF EMBODIMENTS

Embodiments of the present disclosure provide a method, device, and system for monitoring a quickpath interconnect link, which can implement monitoring on a QPI link with simple operations at a relatively low cost.

To make the invention objectives, features, and advantages of the present disclosure more obvious and comprehensible, the following clearly and completely describes the technical solutions in the embodiments of the present disclosure with reference to the accompanying drawings. The described embodiments are merely a part rather than all of the embodiments of the present disclosure. All other embodiments obtained by a person of ordinary skill in the art based on the embodiments of the present disclosure shall fall within the protection scope of the present disclosure.

In the embodiments of the present disclosure, an action subject that implements the method for monitoring a quickpath interconnect link is a device for monitoring a quickpath interconnect link. In a practical application, the device for monitoring a quickpath interconnect link may specifically be integrated into a type of onboard administrator (OA) management software for implementation, and a user may use a common personal computer (PC) controller to access the onboard administrator management software through a network so as to implement real-time monitoring on a quickpath interconnect link. The device for monitoring a quickpath interconnect link may further be an independent device and is installed on an onboard administrator server in a manner that software controls hardware, and a user may use a common PC controller to implement real-time monitoring on a quickpath interconnect link by using the device for monitoring a quickpath interconnect link. The device for monitoring a quickpath interconnect link may further be an independent device and is installed on a common PC controller in a manner that software controls hardware for implementation. A specific implementation manner is not limited herein.

It should be noted that the device for monitoring a quickpath interconnect link in the embodiments of the present disclosure runs within a system for monitoring a quickpath interconnect link. The monitoring system may specifically include: a device for monitoring a quickpath interconnect link, a common PC controller, an onboard administrator server, a system under test, and a switch, where the common PC controller accesses the OA server by using the switch in a network connection manner.

Figure 1:
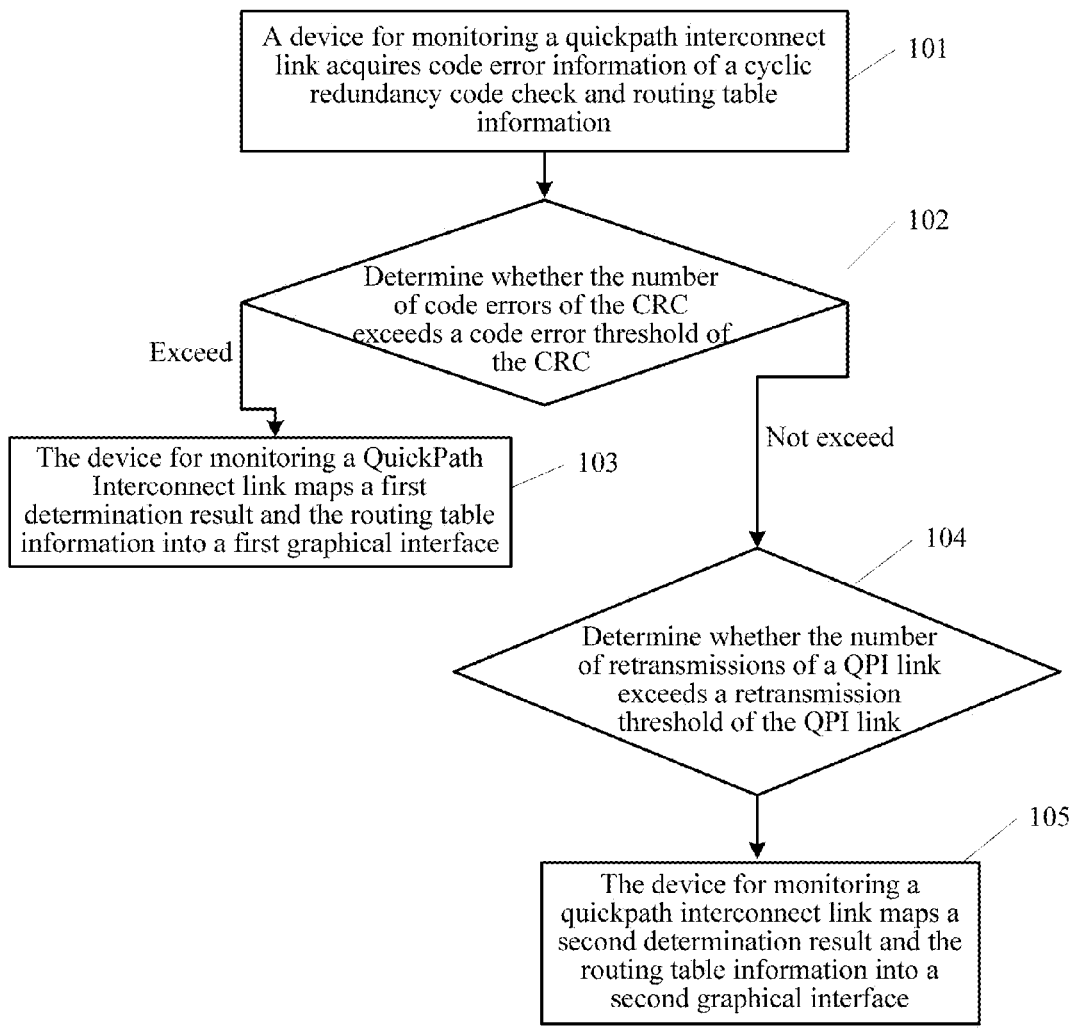
FIG. 1 is a schematic diagram of a method for monitoring a quickpath interconnect link according to an embodiment of the present disclosure.

Referring to FIG. 1, a method for monitoring a quickpath interconnect link provided in an embodiment of the present disclosure includes:

101. A device for monitoring a quickpath interconnect link acquires code error information of a cyclic redundancy code check of a system under test and routing table information of the system under test, where the code error information of the cyclic redundancy code check includes the number of code errors of the cyclic redundancy code check and the number of retransmissions on a quickpath interconnect link.

In the embodiment of the present disclosure, to implement monitoring on the system under test (SUT), the device for monitoring a quickpath interconnect link (QPI) acquires the code error information of the cyclic redundancy code check (CRC) of the SUT and the routing table information of the SUT.

In the embodiment of the present disclosure, the system under test is a collection of nodes that need to be monitored by the device for monitoring a QPI link. The system under test includes one master node and multiple nodes. When a monitoring system is powered on, the CPU of the master node and each node in the system under test automatically establish connections with another node in a local link. After successful handshakes, they exchange link layer parameters, and the master node and each node obtain socket information, port information, transmission rates, and the like of other nodes. At this time, the CPUs of the master node and each node enter a waiting state. The CPU of the master node in the system under test establishes a routing table and stores the routing table information, where the routing table is used to record routing information of all nodes (where the all nodes include the master node and each node) in the system under test. In a practical application, the CPU of the master node may specifically find all sockets on a network by using a breadth-first search algorithm to implement establishment of a routing table.

It should be noted that the code error information of the CRC in the embodiment of the present disclosure includes the number of the code errors of the CRC and the number of retransmissions on the QPI link. During data transmission on the QPI link, if a link layer finds a code error of the CRC, a CPU code error times register in the system under test records the number of the code errors of the CRC. After the link layer finds the code error of the CRC, the QPI link tries self-healing and retransmits data, and a QPI link retransmission times register in the system under test records the number of the retransmissions on the QPI link.

In the embodiment of the present disclosure, there are multiple implementation manners for the device for monitoring a QPI link to acquire the code error information of the CRC of the SUT and the routing table information of the SUT. One of the implementation manners is as follows: The device for monitoring a QPI link acquires the code error information of the CRC of the system under test and the routing table information of the system under test through an OA server connected to the device for monitoring a QPI link. The following manner may specifically be used by the OA server to acquire the code error information of the CRC of the system under test and the routing table information of the system under test: The OA server acquires the code error information of the CRC and the routing table information from a baseboard management controller (BMC) of the system under test through an intelligent platform management interface (IPMI). Information transferring between the BMC of the system under test and the OA server is implemented through the IPMI. The BMC of the system under test transfers the code error information of the CRC and the routing table information to the OA server through the IPMI.

It should be noted that, in the embodiment of the present disclosure, the following manner may specifically be used by the BMC of the system under test to acquire the routing table information: Firstly, the master node of the system under test establishes the routing table information of the system under test after all nodes in the system under test exchange the link layer parameters; and then the BMC of the system under test acquires the routing table information from the master node. Multiple implementation manners may specifically be used by the BMC of the system under test to acquire the routing table information from the master node. One implementable manner is as follows: A basic input output system (BIOS) of the master node sends the routing table information to the BMC of the system under test through a keyboard controller style interface (KCS), and the BMC of the system under test may receive the routing table information sent by the BIOS of the master node through the KCS. Another implementable manner is as follows: The BMC of the system under test reads CPU-related registers of the master node through a system management bus (SMBUS) and obtains, through parsing, the routing table information. The CPU-related registers refer to 3 registers included in each QPI port among 12 QPI ports included in the CPU of the master node. The 3 registers are a router table configuration register, a router read register, and a router write register.

It should be noted that, in the embodiment of the present disclosure, the following manner may specifically be used by the BMC of the system under test to acquire the code error information of the CRC: The BMC of the system under test reads the code error information of the CRC of the nodes in the system under test through the system management bus. The code error information of the CRC in the embodiment of the present disclosure includes the number of the code errors of the CRC and the number of the retransmissions on the QPI link.

102. The device for monitoring a quickpath interconnect link determines whether the number of the code errors of the cyclic redundancy code check exceeds a preset code error threshold of the cyclic redundancy code check, and obtains a first determination result; if the first determination result is that the number of the code errors of the cyclic redundancy code check exceeds the preset code error threshold of the cyclic redundancy code check, triggers execution of operation 103; and if the first determination result is that the number of the code errors of the cyclic redundancy code check does not exceed the preset code error threshold of the cyclic redundancy code check, triggers execution of operation 104.

In the embodiment of the present disclosure, after the device for monitoring a QPI link acquires the code error information of the CRC of the system under test and the routing table information of the system under test, the device for monitoring a QPI link determines whether the number of the code errors of the CRC exceeds the preset code error threshold of the CRC, and obtains the first determination result. The first determination result indicates a value relationship between the number of the code errors of the CRC acquired by the device for monitoring a QPI link and the preset code error threshold of the CRC. If the first determination result is that the number of the code errors of the CRC exceeds the code error threshold of the CRC, it is indicated that a QPI link is abnormal, and the device for monitoring a QPI link triggers execution of operation 103. If the first determination result is that the number of the code errors of the CRC does not exceed the code error threshold of the CRC, the device for monitoring a QPI link triggers execution of operation 104. It should be noted that the code error threshold of the CRC may be preset according to a specific application scenario. For example, the code error threshold of the CRC may be set to a small value according to a user's actual requirement. Definitely, the code error threshold of the CRC may also be set to a large value but cannot exceed an overflow value of the CPU code error times register.

103. The device for monitoring a quickpath interconnect link maps the first determination result and the routing table information into a first graphical interface, where the first graphical interface is used to display a quickpath interconnect link connection state between the nodes in the system under test according to the first determination result and the routing table information.

In a practical application, one practical implementation manner is that the following operations may specifically be included for the device for monitoring a quickpath interconnect link to map the first determination result and the routing table information into the first graphical interface:

A1. The device for monitoring a quickpath interconnect link parses the routing table information to obtain a topology structure relationship between each node in the system under test and another node in the system under test.

The device for monitoring a quickpath interconnect link may obtain, through the routing table information, the topology structure relationship between all nodes in the system under test, such as nodes that each node is connected to, and further, may obtain the topology structure relationship between all nodes.

A2. The device for monitoring a quickpath interconnect link acquires, according to the first determination result, whether a link fault exists between each node in the system under test and another node in the system under test.

The device for monitoring a quickpath interconnect link may obtain, from the first determination result, whether the number of the code errors of the cyclic redundancy code check exceeds the preset code error threshold of the cyclic redundancy code check; if the number of the code errors of the cyclic redundancy code check exceeds the preset code error threshold of the cyclic redundancy code check, determines that a link fault exists; and if the number of code errors of the cyclic redundancy code check does not exceed the preset code error threshold of the cyclic redundancy code check, determines that no link fault exists.

A3. The device for monitoring a quickpath interconnect link displays, on the topology structure relationship, a link that is between nodes and on which a link fault exists, to obtain the first graphical interface.

The device for monitoring a quickpath interconnect link can obtain the first graphical interface by displaying the link that is between nodes and on which a link fault exists on the topology structure relationship between each node and another node in the system under test.

For example, the device for monitoring a quickpath interconnect link may analyze, by using an analysis function, the topology structure relationship between all nodes and the code error information of the CRC to form standard extensible markup language (XML) data, and draw a dynamic vector diagram by using a JavaScript function, to obtain the first graphical interface. The common PC controller may use a browser to access the first graphical interface. A latest QPI link connection state may be acquired by periodical page refreshing implemented at the browser end, and the latest QPI link connection state may also be acquired by manual refreshing through a button.

It should be noted that, in operation 103 in the embodiment of the present disclosure, one implementation manner is that the device for monitoring a QPI link displays the abnormal quickpath interconnect link through the first graphical interface.

When the device for monitoring a QPI link displays the abnormal QPI link through the first graphical interface, the following optional implementation manner may further be included in the embodiment of the present disclosure: The device for monitoring a QPI link isolates an abnormal node on the abnormal QPI link and goes back to operation 102 to start execution of 102 and a subsequent operation step.

If the first determination result is that the number of the code errors of the cyclic redundancy code check exceeds the preset code error threshold of the cyclic redundancy code check, the following implementation manner may further be included in the embodiment of the present disclosure: The device for monitoring a quickpath interconnect link triggers a first alarm. In the embodiment of the present disclosure, there are multiple manners for the device monitoring a QPI link to trigger the first alarm, for example, sending a mail to a user, sending a mobile phone short message to a user, displaying a particular file on the device for monitoring a QPI link (for example, popping an alarm box, playing a certain audio file, or playing a certain video file), and so on. Any alarm manner that is used to display a QPI link fault to a user can be used as the first alarm manner and is triggered by the device for monitoring a quickpath interconnect link.

In the embodiment of the present disclosure, the device for monitoring a QPI link acquires the code error information of the CRC and the routing table information in 101 and obtains the first determination result in 102, and the device for monitoring a QPI link may map the first determination result and the routing table information into the first graphical interface in 103. On the graphical interface, the QPI link connection state may be displayed in real time. The device for monitoring a QPI link may obtain the QPI link connection state at any time through the first graphical interface. A user may use the common PC controller to access the device for monitoring a QPI link to view the QPI link connection state in real time.

104. The device for monitoring a quickpath interconnect link determines whether the number of the retransmissions on the quickpath interconnect link exceeds a preset retransmission threshold of the quickpath interconnect link, obtains a second determination result, and triggers execution of 105.

In the embodiment of the present disclosure, the device for monitoring a QPI link may determine whether the number of the retransmissions on the QPI link exceeds the preset retransmission threshold of the QPI link and obtains the second determination result. The second determination result indicates a value relationship between the number of the retransmissions on the QPI link acquired by the device for monitoring a QPI link and the preset retransmission threshold of the QPI link. If the second determination result is that the number of the retransmissions on the QPI link exceeds the preset retransmission threshold of the QPI link, it is indicated that the QPI link is abnormal. If the second determination result is that the number of the retransmissions on the QPI link does not exceed the preset retransmission threshold of the QPI link, it is indicated that the QPI link is not abnormal. It should be noted that the retransmission threshold of the QPI link may be preset according to a specific application scenario. For example, the retransmission threshold of the QPI link may be set to a small value according to a user's actual requirement. Definitely, the retransmission threshold of the QPI link may also be set to a large value but cannot exceed an overflow value of the QPI link retransmission times register.

105. The device for monitoring a quickpath interconnect link maps the second determination result and the routing table information into a second graphical interface, where the second graphical interface is used to display the quickpath interconnect link connection state between the nodes in the system under test according to the second determination result and the routing table information.

In the embodiment of the present disclosure, the device for monitoring a QPI link may map the second determination result and the routing table information into the second graphical interface. On the second graphical interface, the QPI link connection state may be displayed in real time. The device for monitoring a QPI link may obtain the QPI link connection state at any time through the graphical interface. A user may use the common PC controller to access the device for monitoring a QPI link to view the QPI link connection state in real time.

In a practical application, one optional implementation manner is that the following operations may specifically be included for the device for monitoring a quickpath interconnect link to map the first determination result and the routing table information into the second graphical interface:

B1. The device for monitoring a quickpath interconnect link parses the routing table information to obtain a topology structure relationship between each node in the system under test and another node in the system under test.

The device for monitoring a quickpath interconnect link may obtain, through the routing table information, the topology structure relationship between all nodes in the system under test, such as nodes that each node is connected to, and further, may obtain the topology structure relationship between all nodes.

B2. The device for monitoring a quickpath interconnect link acquires, according to the second determination result, whether a link fault exists between each node in the system under test and another node in the system under test.

The device for monitoring a quickpath interconnect link may obtain, from the second determination result, whether the number of the retransmissions on the quickpath interconnect link exceeds the preset retransmission threshold of the quickpath interconnect link; if the number of retransmissions on the quickpath interconnect link exceeds the preset retransmission threshold of the quickpath interconnect link, determines that a link fault exists; and if the number of retransmissions on the quickpath interconnect link does not exceed the preset retransmission threshold of the quickpath interconnect link, determines that no link fault exists.

B3. The device for monitoring a quickpath interconnect link displays, on the topology structure relationship, a link that is between nodes and on which a link fault exists, to obtain the second graphical interface.

The device for monitoring a quickpath interconnect link can obtain the second graphical interface by displaying the link that is between nodes and on which a link fault exists on the topology structure relationship between each node and another node in the system under test.

It should be noted that, in operation 105 in the embodiment of the present disclosure, if the second determination result is that the number of the retransmissions on the quickpath interconnect link exceeds the preset retransmission threshold of the quickpath interconnect link, the second graphical interface is specifically used to display an abnormal quickpath interconnect link; and if the second determination result is that the number of the retransmissions on the quickpath interconnect link does not exceed the preset retransmission threshold of the quickpath interconnect link, the second graphical interface is specifically used to display a normal quickpath interconnect link.

When the device for monitoring a QPI link displays the abnormal QPI link through the second graphical interface, the following optional implementation manner may further be included in the embodiment of the present disclosure: The device for monitoring a QPI link isolates an abnormal node on the abnormal QPI link and goes back to operation 102 to start execution of 102 and a subsequent operation step.

If the second determination result is that the number of the retransmissions on the quickpath interconnect link exceeds the preset retransmission threshold of the quickpath interconnect link, the following implementation manner may further be included in the embodiment of the present disclosure: The device for monitoring a quickpath interconnect link triggers a second alarm. In the embodiment of the present disclosure, there are multiple manners for the device for monitoring a QPI link to trigger the second alarm, for example, sending a mail to a user, sending a mobile phone short message to a user, displaying a particular file on the device for monitoring a QPI link (for example, popping an alarm box, playing a certain audio file, or playing a certain video file), and so on. Any alarm manner that is used to display a QPI link fault to a user can be used as the second alarm manner and is triggered by the device for monitoring a quickpath interconnect link. It should be further noted that, before the device for monitoring a quickpath interconnect link maps the second determination result and the routing table information into the second graphical interface, the device for monitoring a quickpath interconnect link may trigger the second alarm. The first alarm method may be the same as or different from the second alarm method, which is not limited herein.

In the embodiment of the present disclosure, after a device for monitoring a quickpath interconnect link acquires code error information of a cyclic redundancy code check of a system under test and routing table information of the system under test, the device for monitoring a quickpath interconnect link maps, in a case that the number of code errors of the cyclic redundancy code check exceeds a preset code error threshold of the cyclic redundancy code check, a first determination result and the routing table information into a first graphical interface; and in a case that the number of code errors of the cyclic redundancy code check does not exceed the preset code error threshold of the cyclic redundancy code check, obtains a second determination result by determining whether the number of the retransmissions on a quickpath interconnect link exceeds a preset retransmission threshold of the quickpath interconnect link, and maps the second determination result and the routing table information into a second graphical interface. By using the first graphical interface or the second graphical interface, a user can intuitively view a QPI link connection state of the entire system under test. In the embodiment of the present disclosure, the code error information of the cyclic redundancy code check of the system under test and the routing table information of the system under test may be acquired by a software apparatus (that is the device for monitoring a quickpath interconnect link in the embodiment of the present disclosure), and no independent test device needs to be added (for example, no load board needs to be added) for implementation. In addition, the device for monitoring a quickpath interconnect link is capable of obtaining a graphical interface by mapping the first determination result or the second determination result and the routing table information, and no independent test device is further required (that is no oscilloscope needs to be added) for transforming QPI signal to a waveform file and outputting the waveform file to test software SIGTEST. In the embodiment of the present disclosure, the QPI link connection state can be displayed in real time through a graphical interface, thereby reducing a test cost, and implementing an operation process easily and simply.

Figure 2:
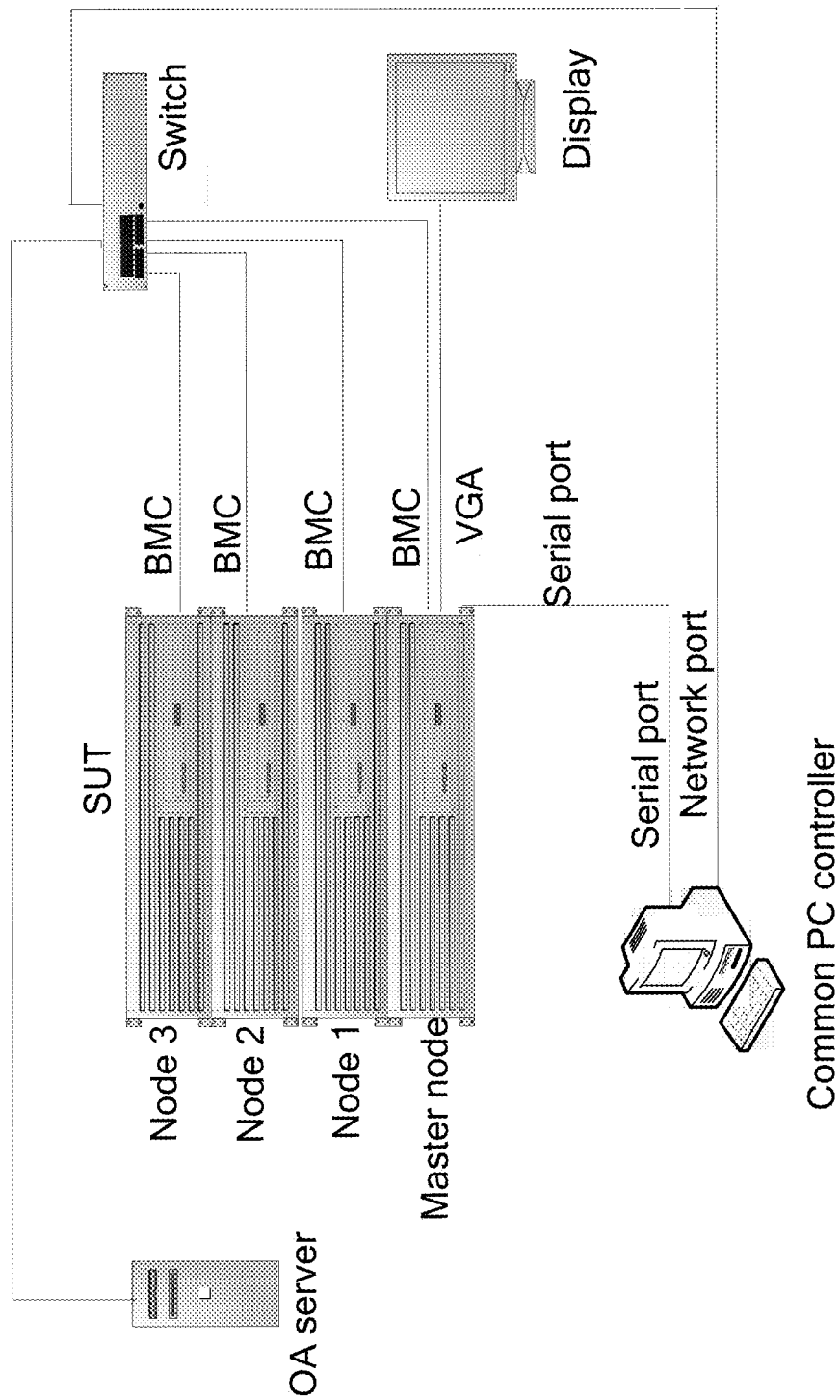
FIG. 2 is a system networking diagram of a method for monitoring a quickpath interconnect link according to an embodiment of the present disclosure.

The above embodiment introduces a method for monitoring a quickpath interconnect link according to an embodiment of the present disclosure and the following uses a specific application scenario to introduce the method for monitoring a quickpath interconnect link. As shown in FIG. 2, it is a system networking diagram of a method for monitoring a quickpath interconnect link according to an embodiment of the present disclosure. In FIG. 2, a case that a device for monitoring a quickpath interconnect link is installed on an OA server is used as an example for description. A user may use a common PC controller to access the device for monitoring a quickpath interconnect link through a network to implement real-time monitoring on a quickpath interconnect link. The monitoring system may include: an OA server for running a device for monitoring a QPI link, a common PC controller used by a user, a system under test SUT, and a switch. The system under test includes: node 1, node 2, node 3, and a master node. The common PC controller accesses the OA server through the switch in a network connection manner. BMCs of all nodes (all nodes refer to node 1, node 2, node 3, and the master node) connect to the OA server by using the switch. To display an operating system (OS) of the master node in the system under test, the master node may connect to a monitor by using a video graphics array (VGA). The common PC controller connects to the master node of the system under test through a serial port.

Figure 3:
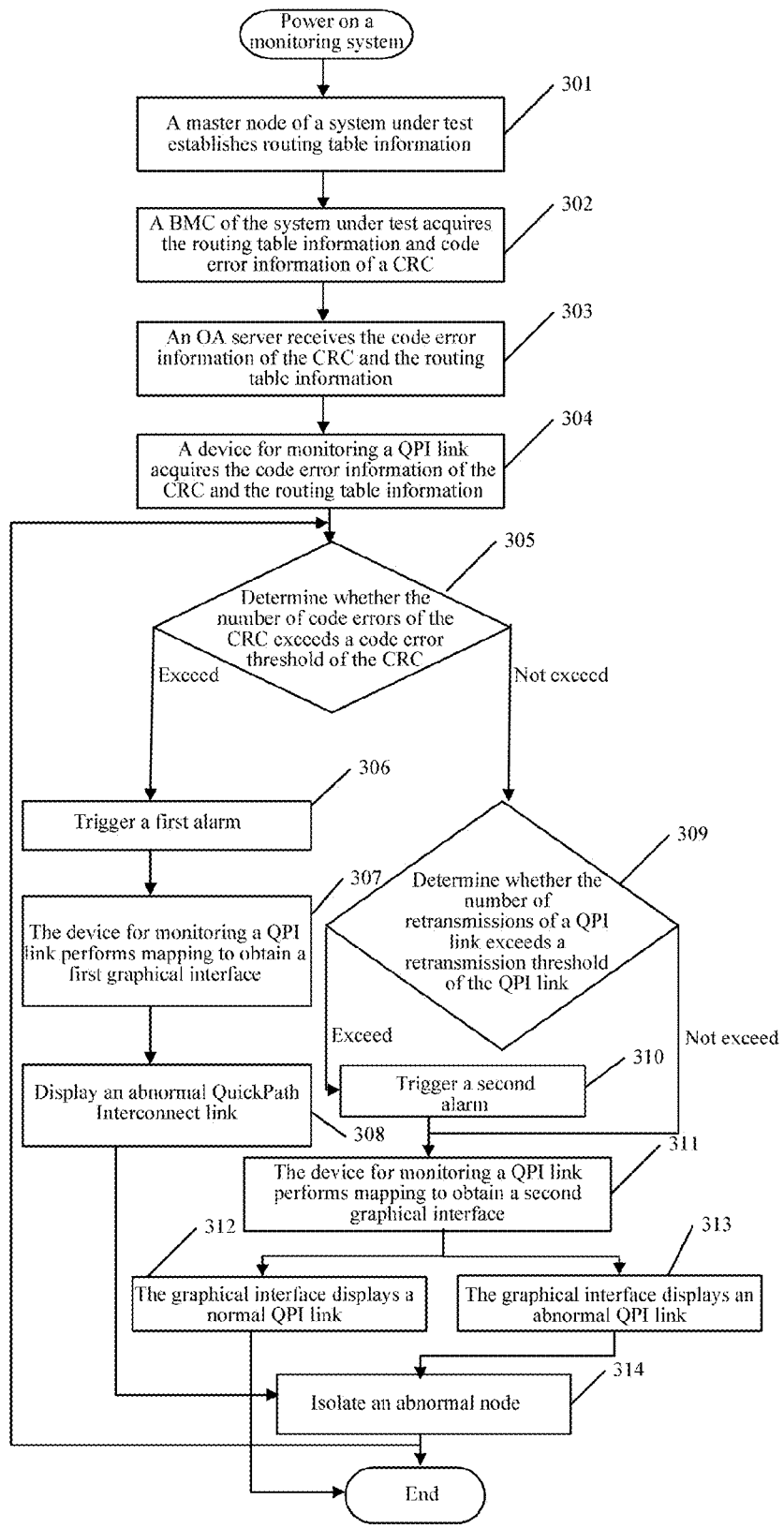
FIG. 3 is a schematic diagram of a method for monitoring a quickpath interconnect link according to an embodiment of the present disclosure.

As shown in FIG. 3, in a specific application scenario, a method for monitoring a quickpath interconnect link includes:

301. A master node of a system under test establishes routing table information.

302. A BMC of the system under test acquires the routing table information and code error information of a CRC.

303. An OA server receives, through an IPMI, the code error information of the CRC and the routing table information that are acquired by the BMC of the system under test.

304. A device for monitoring a QPI link acquires the code error information of the CRC of the system under test and the routing table information of the system under test through the OA server connecting to the device for monitoring a QPI link.

305. The device for monitoring a QPI link determines whether the number of code errors of the CRC exceeds a preset code error threshold of the CRC, and obtains a first determination result; if the first determination result is that the number of the code errors of the CRC exceeds the preset code error threshold of the CRC, triggers execution of operation 306; and if the first determination result is that the number of the code errors of the CRC does not exceed the preset code error threshold of the CRC, triggers execution of operation 309.

306. The device for monitoring a QPI link triggers a first alarm and then triggers execution of 307.

307. The device for monitoring a QPI link maps the first determination result and the routing table information into a first graphical interface and then triggers execution of 308.

308. The device for monitoring a QPI link displays an abnormal quickpath interconnect link through the first graphical interface and then triggers execution of 314.

309. The device for monitoring a QPI link determines whether number of retransmissions on a QPI link exceeds a preset retransmission threshold of the QPI link, and obtains a second determination result; if the second determination result is that the number of the retransmissions on the QPI link exceeds the preset retransmission threshold of the QPI link, triggers execution of 310; and if the second determination result is that the number of the retransmissions on the QPI link does not exceed the preset retransmission threshold of the QPI link, directly triggers execution of 311.

310. The device for monitoring a QPI link triggers a second alarm and then triggers execution of 311.

311. The device for monitoring a QPI link maps the second determination result and the routing table information into a second graphical interface; according to the second determination result, if the second determination result is that the number of the retransmissions on the quickpath interconnect link exceeds the preset retransmission threshold of the quickpath interconnect link, and the second graphical interface is specifically used to display an abnormal quickpath interconnect link, triggers execution of 313; and according to the second determination result, if the second determination result is that the number of the retransmissions on the quickpath interconnect link does not exceed the preset retransmission threshold of the quickpath interconnect link, and the second graphical interface is specifically used to display a normal quickpath interconnect link, triggers execution of 312.

312. The device for monitoring a QPI link displays a normal quickpath interconnect link through the second graphical interface, and then completes the whole monitoring process.

313. The device for monitoring a QPI link displays an abnormal quickpath interconnect link through the second graphical interface, and then triggers execution of 314.

314. The device for monitoring a QPI link isolates an abnormal node on the abnormal OPI link, and then may complete the whole monitoring process, or may again trigger continual execution of 305 and an operation after 305.

Figure 4:
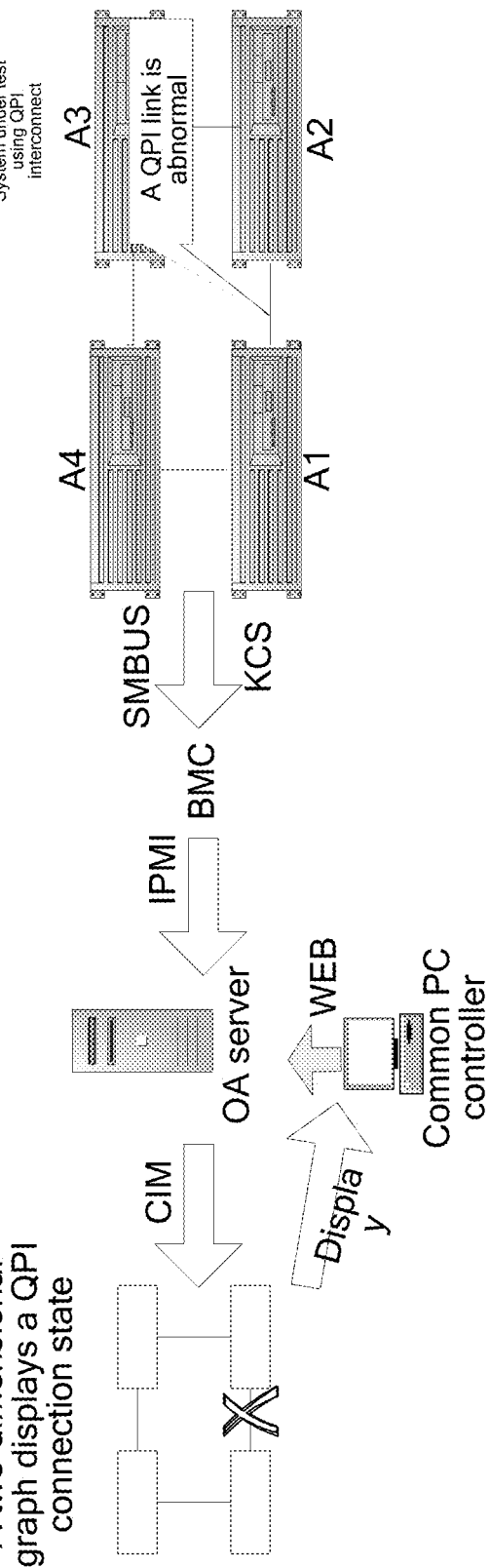
FIG. 4 is a schematic diagram of implementing real-time monitoring on a quickpath interconnect link according to an embodiment of the present disclosure.

To describe the method for monitoring a quickpath interconnect link in this embodiment of the present disclosure more clearly, refer to a schematic diagram of real-time monitoring on a QPI link shown in FIG. 4. In FIG. 4, a system under test includes four nodes A1, A2, A3, and A4, where A1 is a master node. A BIOS of the master node A1 sends routing table information to a BMC of the system under test through a KCS, and the BMC of the system under test reads error code information of a CRC of nodes in the system under test through an SMBUS. The BMC of the system under test send the error code information of the CRC of the system under test and the routing table information of the system under test to an OA server through an IPMI. A device for monitoring a QPI link acquires the error code information of the CRC and the routing table information from the OA server through a web connection. The device for monitoring a QPI link determines whether the number of error codes of the CRC exceeds a preset error code threshold of the CRC and obtains a first determination result. The device for monitoring a QPI link maps the first determination result and the routing table information into a graphical interface. The device for monitoring a QPI link determines whether the number of retransmissions on a QPI link exceeds a preset retransmission threshold of the QPI link, and obtains a second determination result. The device for monitoring a QPI link maps the second determination result and the routing table information into a graphical interface. When a user uses a common PC controller to access the device for monitoring a QPI link, a QPI link connection state of the system under test may be viewed in real time. For example, a fault occurs on a link between two nodes A1 and A2, and a user can intuitively view that a fault exists between the two nodes A1 and A2 of the system under test on the graphical interface.

The above embodiments introduce a method for monitoring a quickpath interconnect link, and the following introduces a device for monitoring a quickpath interconnect link. In a practical application, the device for monitoring a quickpath interconnect link may be specifically integrated on a type of onboard administrator management software, and a user may use a common PC controller to access the onboard administrator management software through a network to implement real-time monitoring on a quickpath interconnect link. The device for monitoring a quickpath interconnect link may further be an independent device and is installed on an onboard administrator server in a manner that software controls hardware, and a user may use a common PC controller to implement real-time monitoring on a quickpath interconnect link by using the device for monitoring a quickpath interconnect link. The device for monitoring a quickpath interconnect link may further be an independent device and is installed, for implementation, on a common PC controller in the manner that software controls hardware. A specific implementation manner is not limited herein.

Figure 5:
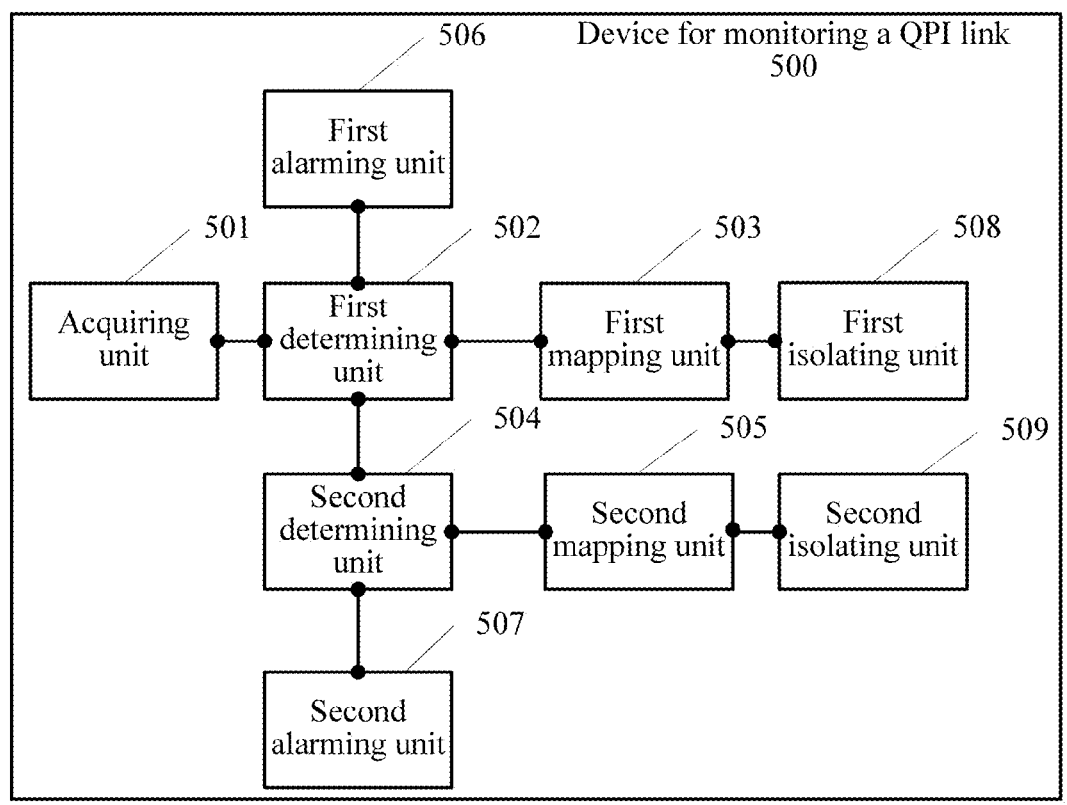
FIG. 5 is a schematic diagram of a device for monitoring a quickpath interconnect link according to an embodiment of the present disclosure.

As shown in FIG. 5, a device for monitoring a QPI link 500 provided in the embodiment of the present disclosure includes: an acquiring unit 501, a first determining unit 502, a first mapping unit 503, a second determining unit 504, and a second mapping unit 505.

The acquiring unit 501 is configured to acquire code error information of a CRC of a system under test and routing table information of the system under test, where the code error information of the CRC includes the number of code errors of the CRC and the number of retransmissions on a QPI link.

The first determining unit 502 is configured to determine whether the number of the code errors of the CRC exceeds a preset code error threshold of the CRC, and obtain a first determination result; if the first determination result is that the number of the code errors of the cyclic redundancy code check exceeds the preset code error threshold of the cyclic redundancy code check, trigger execution of a first alarming unit 506; and if the first determination result is that the number of the code errors of the cyclic redundancy code check does not exceed the preset code error threshold of the cyclic redundancy code check, trigger execution of the second determining unit 504

The first mapping unit 503 is configured to, when the first determination result is that the number of the code errors of the cyclic redundancy code check exceeds the preset code error threshold of the cyclic redundancy code check, map the first determination result and the routing table information into a first graphical interface, where the first graphical interface is used to display a quickpath interconnect link connection state between nodes in the system under test according to the first determination result and the routing table information.

The second determining unit 504 is configured to, when the first determination result is that the number of the code errors of the cyclic redundancy code check does not exceed the preset code error threshold of the cyclic redundancy code check, determine whether the number of the retransmissions on the QPI link exceeds a preset retransmission threshold of the QPI link, and obtain a second determination result.

The second mapping unit 505 is configured to map the second determination result and the routing table information into a second graphical interface, where the second graphical interface is used to display the QPI link connection state between nodes in the system under test according to the second determination result and the routing table information.

It should be noted that, for the acquiring unit 501, a specific implementation manner is as follows: The acquiring unit 501 is specifically configured to acquire the code error information of the CRC of the system under test and the routing table information of the system under test through an onboard administrator server connecting to the device for monitoring a QPI link, where after being obtained through a BMC of the system under test, the code error information of the CRC and the routing table information are sent by the baseboard management controller to the onboard administrator server through an IPMI.

It should be noted that, for the first mapping unit 503, a specific implementation manner is that the first mapping unit 503 may specifically include: a parsing module, configured to parse the routing table information to obtain a topology structure relationship between each node in the system under test and another node in the system under test; a first acquiring module, configured to acquire, according to the first determination result, whether a link fault exists between each node in the system under test and another node in the system under test; and a first displaying module, configured to display, on the topology structure relationship, a link that is between nodes and on which a link fault exists, to obtain the first graphical interface.

It should be noted that, for the second mapping unit 505, a specific implementation manner is that the second mapping unit 505 may specifically include: a parsing module, configured to parse the routing table information to obtain the topology structure relationship between each node in the system under test and another node in the system under test; a second acquiring module, configured to acquire, according to the second determination result, whether a link fault exists between each node in the system under test and another node in the system under test; and a second displaying module, configured to display, on the topology structure relationship, the link that is between nodes and on which a link fault exists, to obtain the second graphical interface.

It should be noted that the device for monitoring a QPI link 500 may optionally further include the following units: the first alarming unit 506, configured to trigger a first alarm when the first determination result is that the number of the code errors of the cyclic redundancy code check exceeds the preset code error threshold of the cyclic redundancy code check; and a second alarming unit 507, configured to trigger a second alarm when the second determination result is that the number of retransmissions on the quickpath interconnect link exceeds the preset retransmission threshold of the quickpath interconnect link.

It should be noted that the device for monitoring a QPI link 500 may optionally further include the following units: a first isolating unit 508, configured to, when the first graphical interface displays an abnormal quickpath interconnect link, isolate an abnormal node on the abnormal quickpath interconnect link, and go back to execution of the first determining unit 502; and a second isolating unit 509, configured to, when the second graphical interface displays an abnormal quickpath interconnect link, isolate an abnormal node on the abnormal quickpath interconnect link, and go back to execution of the first determining unit 502.

It should be noted because content such as information interaction and an execution process between each module/unit in the above apparatus is based on a same idea as that in the method embodiments of the present disclosure, a technical effect brought by the content is the same as that in the method embodiments of the present disclosure. For detailed content, reference may be made to description in the method embodiment of the present disclosure shown in FIG. 1, and no further details are provided herein.

In the embodiment of the present disclosure, after an acquiring unit 501 acquires code error information of a cyclic redundancy code check of a system under test and routing table information of the system under test, a first determining unit 502 determines whether the number of code errors of the CRC exceeds a preset code error threshold of the CRC, and obtains a first determination result; when the first determination result is that the number of the code errors of the cyclic redundancy code check exceeds the preset code error threshold of the cyclic redundancy code check, a first mapping unit 503 maps the first determination result and the routing table information into a first graphical interface; in a case that the number of code errors of the cyclic redundancy code check does not exceed the preset code error threshold of the cyclic redundancy code check, a second determining unit 504 determines whether the number of retransmissions on a quickpath interconnect link exceeds a preset retransmission threshold of the quickpath interconnect link, and obtains a second determination result; and a second mapping unit 505 maps the second determination result and the routing table information into a second graphical interface, so that a user can intuitively view a QPI link connection state of the entire system under test. In the embodiment of the present disclosure, no independent test device and independent test software need to be added, thereby reducing a test cost, and implementing an operation process easily and simply.

A system for monitoring a quickpath interconnect link provided in an embodiment of the present disclosure includes: a system under test and a device for monitoring a quickpath interconnect link that is capable of displaying a quickpath interconnect link connection state between nodes in the system under test.

The device for monitoring a quickpath interconnect link is configured to acquire code error information of a cyclic redundancy code check of the system under test and routing table information of the system under test, where the code error information of the cyclic redundancy code check includes the number of code errors of the cyclic redundancy code check and the number of retransmissions on a quickpath interconnect link; determine whether the number of the code errors of the cyclic redundancy code check exceeds a preset code error threshold of the cyclic redundancy code check, and obtain a first determination result; if the first determination result is that the number of the code errors of the cyclic redundancy code check exceeds the preset code error threshold of the cyclic redundancy code check, map the first determination result and the routing table information into a first graphical interface, where the first graphical interface is used to display the quickpath interconnect link connection state between the nodes in the system under test according to the first determination result and the routing table information; if the first determination result is that the number of the code errors of the cyclic redundancy code check does not exceed the preset code error threshold of the cyclic redundancy code check, determine whether the number of the retransmissions on the quickpath interconnect link exceeds a preset retransmission threshold of the quickpath interconnect link, and obtain a second determination result; and map the second determination result and the routing table into a second graphical interface, where the second graphical interface is used to display the quickpath interconnect link connection state between the nodes in the system under test according to the second determination result and the routing table.

In a practical application, one implementable manner is that the system for monitoring a quickpath interconnect link further includes: an OA server and a switch. The device for monitoring a quickpath interconnect link is loaded on the OA server and the switch is configured to implement data interaction between the OA server and the system under test.

The system under test includes a master node and a baseboard management controller, where the master node is configured to establish the routing table information of the system under test; and the baseboard management controller is configured to acquire the routing table information from the master node, read the code error information of the cyclic redundancy code check of nodes in the system under test through a SMBUS, and send the code error information of the cyclic redundancy code check and the routing table information to the OA server through an IPMI.

The OA server is configured to receive the code error information of the cyclic redundancy code check and the routing table information that are sent by the baseboard management controller, and send the code error information of the cyclic redundancy code check and the routing table information to the device for monitoring a quickpath interconnect link.

In a practical application, another implementable manner is that the system for monitoring a quickpath interconnect link further includes: an OA server, a common personal computer controller, and a switch. The device for monitoring a quickpath interconnect link is loaded on the common personal computer controller, and the switch is configured to implement data interaction between the OA server and the system under test and interaction between the OA server and the common personal computer controller.

The system under test includes a master node and a baseboard management controller, where the master node is configured to establish the routing table information of the system under test; and the baseboard management controller is configured to acquire the routing table information from the master node, read the code error information of the cyclic redundancy code check of nodes in the system under test through a SMBUS, and send the code error information of the cyclic redundancy code check and the routing table information to the OA server through an IPMI.

The OA server is configured to receive the code error information of the cyclic redundancy code check and the routing table information that are sent by the baseboard management controller, and send the code error information of the cyclic redundancy code check and the routing table information to the device for monitoring a quickpath interconnect link.

The common personal computer controller is configured to display the first graphical interface or the second graphical interface that is obtained by the device for monitoring a quickpath interconnect link.

For a detailed system network structure, reference may be made to FIG. 2, and no further details are provided herein.

It should be noted because content such as information interaction and an execution process between each module/unit in the above apparatus is based on the same idea as that in the method embodiments of the present disclosure, a technical effect brought by the content is the same as that in the method embodiments of the present disclosure. For detailed content, reference may be made to description in the method embodiments of the present disclosure shown in FIG. 1 and FIG. 2, and no further details are provided herein.

In the embodiment of the present disclosure, after a device for monitoring a quickpath interconnect link acquires code error information of a cyclic redundancy code check of a system under test and routing table information of the system under test, the device for monitoring a quickpath interconnect link maps, in a case that the number of code errors of the cyclic redundancy code check exceeds a preset code error threshold of the cyclic redundancy code check, a first determination result and the routing table information into a first graphical interface; and in a case that the number of code errors of the cyclic redundancy code check does not exceed the preset code error threshold of the cyclic redundancy code check, obtains a second determination result by determining whether the number of retransmissions on a quickpath interconnect link exceeds a preset retransmission threshold of the quickpath interconnect link, and maps the second determination result and the routing table information into a second graphical interface. By using the first graphical interface or the second graphical interface, a user can intuitively view a QPI link connection state of the entire system under test. In the embodiment of the present disclosure, the code error information of the cyclic redundancy code check of the system under test and the routing table information of the system under test may be acquired by a software apparatus (that is the device for monitoring a quickpath interconnect link in the embodiment of the present disclosure), and no independent test device needs to be added (for example, no load board needs to be added) for implementation. In addition, the device for monitoring a quickpath interconnect link is capable of obtaining a graphical interface by mapping the first determination result or the second determination result and the routing table information, and no independent test device is further required (that is no oscilloscope needs to be added) for transforming QPI signal to a waveform file and outputting the waveform file to test software SIGTEST. In the embodiment of the present disclosure, the QPI link connection state can be displayed in real time by using a graphical interface, thereby reducing a test cost, and implementing an operation process easily and simply.

Persons of ordinary skill in the art can understand that all or a part of the steps in each of the foregoing method embodiments may be implemented by a program instructing relevant hardware. The program may be stored in a computer readable storage medium. The storage medium may be a read-only memory, a magnetic disk, an optical disk or the like.

The foregoing describes in detail a method for monitoring a quickpath interconnect link, device, and system provided in the present disclosure. A person skilled in the art may make modifications to the specific implementation manners and application scopes according to the idea of embodiments of the present disclosure. Therefore, the content of this specification should not be construed as a limitation on the present disclosure.

What is claimed is:

1. A method for displaying a state of a quickpath interconnect link in a multi-processor system through a graphical interface, comprising:
    receiving, by a monitor device, error code information from a board management controller (BMC) of the multi-processor system, wherein the multi-processor system includes a plurality of processors interconnected by quickpath interconnect links, wherein the error code information includes a code error number indicating code errors of a cyclic redundancy code check on a target quickpath interconnect link and a retransmission number indicating frequency of retransmitting data through the target quickpath interconnect link;
    comparing, by the monitor device, the retransmission number with a retransmission threshold to generate a result when the code error number does not exceed a code error threshold, wherein the result indicates the target quickpath interconnect link is abnormal when the retransmission number exceeds the retransmission threshold, and wherein the result indicates the target quickpath interconnect link is normal when the retransmission number does not exceed the retransmission threshold;
    obtaining by the monitor device, routing information of the processors, wherein the routing information indicates topology structure of the processors; and
    displaying, by the monitor device, the result on the topology structure through a graphical interface.

2. The method according to claim 1, wherein method further comprises isolating, by the monitor device, an abnormal processor on the target quickpath interconnect link when the result indicates that the target quickpath interconnect link is abnormal, and wherein the abnormal processor is in an abnormal connection state.

3. The method according to claim 1, wherein the step of obtaining routing information comprises obtaining the routing information through an onboard administrator server connected to the monitor device.

4. The method according to claim 1, wherein the step of obtaining routing information comprises obtaining the routing information from a master processor of the processors, wherein the routing information is established by the master processor after link layer parameters are exchanged between the processors.

5. A device for displaying a state of a quickpath interconnect link in a multi-processor system through a graphical interface, comprising:
    an interface for communicating with a board management controller (BMC) of the multi-processor system, wherein the multi-processor system further includes a plurality of processors interconnected by quickpath interconnect links; and
    a central processing unit (CPU) configured to receive error code information from the BMC, wherein the error code information includes a code error number indicating code errors of a cyclic redundancy code check on a target quickpath interconnect link and a retransmission number indicating frequency of retransmitting data through the target quickpath interconnect link;
    compare the retransmission number with a retransmission threshold to generate a result when the code error number does not exceed a code error threshold, wherein the result indicates the target quickpath interconnect link is abnormal when the retransmission number exceeds the retransmission threshold, and wherein the result indicates the target quickpath interconnect link is normal when the retransmission number does not exceed the retransmission threshold;
    obtain routing information of the processors, wherein the routing information indicates topology structure of the processors; and
    display the result on the topology structure through a graphical interface.

6. The device according to claim 5, wherein the CPU is further configured to isolate an abnormal processor on the target quickpath interconnect link when the result indicates the target quickpath interconnect link is abnormal, wherein the abnormal processor is in an abnormal connection state.

7. A non-transitory computer readable storage medium comprising computer-executable instructions that, when executed by a central processing unit (CPU) of a computer, displays a state of a quickpath interconnect link in a multi-processor system comprising a plurality of processors interconnected by quickpath interconnect links, by performing the steps of:
    receiving error code information from a board management controller (BMC) of the system, wherein the error code information includes a code error number indicating code errors of a cyclic redundancy code check on a target quickpath interconnect link and a retransmission number indicating frequency of retransmitting data through the target quickpath interconnect link;

comparing the retransmission number with a retransmission threshold to generate a result when the code error number does not exceed a code error threshold, wherein the result indicates the target quickpath interconnect link is abnormal when the retransmission number exceeds the retransmission threshold, and wherein the result indicates the target quickpath interconnect link is normal when the retransmission number does not exceed the retransmission threshold;

obtaining routing information of the processors, wherein the routing information indicates topology structure of the processors; and displaying the result on the topology structure through a graphical interface.

8. The non-transitory computer readable storage medium according to claim 7, wherein the computer further performs the following step: isolating an abnormal processor on the target quickpath interconnect link when the result indicates the target quickpath interconnect link is abnormal, wherein the abnormal processor is in an abnormal connection state.

* * * * *